US012666169B2

(12) United States Patent
Mendlovic et al.

(10) Patent No.: US 12,666,169 B2
(45) Date of Patent: *Jun. 23, 2026

(54) DYNAMIC VISION SENSOR COLOR CAMERA

(71) Applicant: Ramot at Tel-Aviv University Ltd., Tel Aviv (IL)

(72) Inventors: David Mendlovic, Tel Aviv (IL); Dan Raviv, Tel Aviv (IL); Khen Cohen, Tel Aviv (IL); Lior Gelberg, Tel Aviv (IL); Mor-Avi Azulay, Tel Aviv (IL); Menahem Koren, Tel Aviv (IL)

(73) Assignee: Ramot at Tel-Aviv University Ltd., Tel Aviv (IL)

( * ) Notice: Subject to any disclaimer, the term of this patent is extended or adjusted under 35 U.S.C. 154(b) by 49 days.

This patent is subject to a terminal disclaimer.

(21) Appl. No.: 18/953,136

(22) Filed: Nov. 20, 2024

(65) Prior Publication Data

US 2025/0126371 A1 Apr. 17, 2025

Related U.S. Application Data

(63) Continuation of application No. 18/709,524, filed as application No. PCT/IB2022/060938 on Nov. 14, 2022, now Pat. No. 12,167,153.

(Continued)

(51) Int. Cl.
*H04N 25/47* (2023.01)
*H04N 23/56* (2023.01)
(Continued)

(52) U.S. Cl.
CPC ............. *H04N 25/47* (2023.01); *H04N 23/56* (2023.01); *H04N 23/74* (2023.01); *H04N 23/84* (2023.01); *H04N 25/707* (2023.01)

(58) Field of Classification Search
CPC ....... H04N 23/56; H04N 25/47; H04N 25/707
(Continued)

(56) References Cited

U.S. PATENT DOCUMENTS 9,894,296 B1 2/2018 Wong
2011/0286646 A1 11/2011 Chen et al.
(Continued)

FOREIGN PATENT DOCUMENTS

CN 111091130 A 1/2020
EP 3907466 A1 11/2021
(Continued)

OTHER PUBLICATIONS

Search Report in related PCT application PCT/IB2022/060938, dated Feb. 23, 2023.
(Continued)

*Primary Examiner* — Anthony J Daniels
(74) *Attorney, Agent, or Firm* — Nathan & Associates Patent Agents Ltd.; Menachem Nathan

(57) ABSTRACT

A dynamic vision sensor (DVS) color camera (DVS-CCam) operable to acquire a color image of a scene, the DVS-CCam including a DVS photosensor comprising DVS pixels, an illuminator operable to transmit a light pattern characterized by temporal changes in intensity and color to illuminate a scene, an optical system configured to collect and focus on the pixels of the DVS photosensor light reflected by features in the scene from the light pattern transmitted by the illuminator, and a processor configured to process DVS signals generated by the DVS pixels responsive to temporal changes in the reflected light to provide a color image of the scene.

11 Claims, 6 Drawing Sheets

Related U.S. Application Data

(60) Provisional application No. 63/279,255, filed on Nov. 15, 2021.

(51) Int. Cl.

| | |
|---|---|
| *H04N 23/74* | (2023.01) |
| *H04N 23/84* | (2023.01) |
| *H04N 25/707* | (2023.01) |

(58) Field of Classification Search
USPC .......................................................... 348/294
See application file for complete search history.

(56) References Cited

U.S. PATENT DOCUMENTS

| | | | |
|---|---|---|---|
| 2014/0320706 A1 | 10/2014 | Shin et al. | |
| 2017/0181244 A1 | 6/2017 | Shur et al. | |
| 2019/0045173 A1* | 2/2019 | Hicks | G01B 11/2545 |
| 2020/0058205 A1* | 2/2020 | Yaffe | G08B 13/1961 |
| 2020/0327308 A1 | 10/2020 | Cheng et al. | |
| 2021/0014435 A1 | 1/2021 | Seo et al. | |
| 2021/0127101 A1 | 4/2021 | Roh et al. | |
| 2021/0168372 A1 | 6/2021 | Zhao et al. | |
| 2022/0038662 A1* | 2/2022 | Tsuchimoto | H04N 25/47 |
| 2022/0166948 A1* | 5/2022 | Kelly | G06T 7/60 |
| 2022/0377222 A1* | 11/2022 | Diken | H04N 23/73 |
| 2024/0027645 A1* | 1/2024 | Niwa | H04N 25/60 |

FOREIGN PATENT DOCUMENTS

| | | |
|---|---|---|
| KR | 20140129893 A | 11/2014 |
| KR | 20200108483 A | 9/2020 |
| KR | 20210048951 A | 5/2021 |

OTHER PUBLICATIONS

Written Opinion in related PCT application PCT/IB2022/060938, dated Feb. 23, 2023.

Office Action in related CN patent application 202280075909.6, dated Sep. 12, 2024.

Office Action in related EP patent application 22892261.3, dated Jan. 2, 2025.

ESR in related EP patent application 22892261.3 dated Dec. 19, 2024.

Office Action in related KR Application 2024-7015592 dated Feb. 28, 2026.

* cited by examiner

400

Brown

Orange

Blue

402

500

502

504

506

DYNAMIC VISION SENSOR COLOR CAMERA

CROSS-REFERENCE TO RELATED APPLICATIONS

This is a continuation from U.S. patent application Ser. No. 18/709,524 filed May 13, 2024 (now allowed), which was a 371 application from international patent application PCT/IB2022/060938 filed Nov. 14, 2022, which claims priority from U.S. Provisional Patent Application No. 63/279,255 filed Nov. 15, 2021, which is expressly incorporated herein by reference in its entirety.

FIELD

The subject matter disclosed herein relates in general to imaging systems and in particular to methods and apparatus for providing a dynamic vision sensor (DVS) camera operable to provide color images of a scene.

BACKGROUND

Conventional cameras that are typically encountered in almost all everyday appliances and devices, such as mobile phones, laptops, and tablets, employ photosensors in which generally all pixels are controlled to register, substantially simultaneously, intensity of light from a scene imaged by the camera. All the pixels are read out from the photosensor to a same frame to provide a black and white or color contrast image of the scene. The cameras are operated to provide videos of a scene from which changes and motion of features in the scene may be determined by acquiring a sequence of contrast images of the scene at sufficiently large frame rates per second (fps). Since data from all the pixels is used to provide each image in the sequence of images in the video, pixels which image features of the scene that are stationary and do not change, contribute the same data repeatedly to each image of the video. As a result, whereas present conventional cameras may be considered to provide videos of unprecedented quality, they generate substantial amounts of redundant data and are relatively inefficient in use of energy, bandwidth, and memory resources.

Dynamic Vision System (DVS) cameras on the other hand, rather than controlling all pixels in a DVS photosensor in consort to register light from a scene simultaneously and then to read out signals from all the pixels to a same frame, operate each pixel in the DVS photosensor independently of the other pixels. Each pixel in the DVS generates and transmits an image data signal, hereinafter also referred to as a DVS image signal, to a controller for processing to provide an image, only when the pixel registers a change in intensity of incident light from the scene that is greater than a predetermined threshold intensity. The image data signal comprises the pixel's address and optionally a signed number indicating if the change in sensed intensity was positive or negative. DVS pixels that image stationary and unchanging features of a scene do not generate image data signals. As a result, DVS cameras provide enhanced sensitivity to changes in a scene, substantially eliminate redundancy in image data that the cameras generate, and provide improved use of camera energy, bandwidth, and memory resources. However, whereas DVS cameras are sensitive to light intensity they are relatively insensitive to color of light and are relatively unsuitable for providing color data for images of scenes they image.

SUMMARY

In various embodiments there is a dynamic vision sensor (DVS) color camera (DVS-CCam) operable to acquire a color image of a scene, the DVS-CCam including a DVS photosensor comprising DVS pixels, an illuminator operable to transmit a light pattern characterized by temporal changes in intensity and color to illuminate a scene, an optical system configured to collect and focus on the pixels of the DVS photosensor light reflected by features in the scene from the light pattern transmitted by the illuminator, and a processor configured to process DVS signals generated by the DVS pixels responsive to temporal changes in the reflected light to provide a color image of the scene.

In various embodiments there is a method of acquiring a color image of a scene with a dynamic vision sensor (DVS) color camera (DVS-CCam) including a DVS photosensor including DVS pixels, the method includes transmitting a light pattern characterized by temporal changes in intensity and color to illuminate a scene, collecting and focusing on the DVS pixels light reflected by features in the scene from the transmitted light pattern, and processing DVS signals generated by the DVS pixels responsive to temporal changes in the reflected light to provide a color image of the scene.

In some embodiments, the transmitted light pattern includes temporally contiguous light pulses.

In some embodiments, the transmitted light pattern includes discrete temporally separated light pulses.

In some embodiments, the transmitted light pattern comprises red, green, and blue light.

In some embodiments, each pixel of the DVS pixels generates a stream of DVS image signals responsive to a change in light intensity during the temporal changes in the reflected light.

In some embodiments, a pixel response value is determined for each pixel of the DVS pixels, the pixel response value a function of a color of a feature in the scene imaged by the pixel.

In some embodiments, the pixel response value is a sum of a number of DVS signals in at least a portion of a stream of DVS image signals generated by the pixel responsive to the temporal change in the reflected light.

In some embodiments, the pixel response value is used to determine a best fit color which minimizes a linear mean square estimation for the pixel response value.

In some embodiments, the DVS-CCam additionally includes a neural network (NN).

In some embodiments, the neural network includes a convolutional neural network (CNN).

In some embodiments, the neural network provides a color for a feature responsive to a feature vector based on a pixel response value associated with a pixel.

In some embodiments, the neural network comprises a contracting portion, an expanding portion, and a plurality of layers connecting the compacting portion and the expanding portion.

In some embodiments, the contracting portion reduces spatial dimensions and increases a number of channels.

In some embodiments, the expanding portion increases spatial dimensions and reduces the number of channels.

In some embodiments, the reduced number of channels includes three channels.

In some embodiments, the plurality of layers is configured to add weights to the NN.

In some embodiments, a loss function includes a weighted average of L1 and a SSIM index.

In some embodiments, the DVS photosensor includes an event-based photosensor.

In some embodiments, the neural network is configured to extract spectral components from visible light other than RGB light for generating hyperspectral images.

In some embodiments, the information associated with the acquired color image is used for reconstructing a following color image.

BRIEF DESCRIPTION OF THE DRAWINGS

Non-limiting examples of embodiments disclosed herein are described below with reference to figures attached hereto that are listed following this paragraph. The drawings and descriptions are meant to illuminate and clarify embodiments disclosed herein and should not be considered limiting in any way. Like elements in different drawings may be indicated by like numerals. Elements in the drawings are not necessarily drawn to scale. In the drawings.

DETAILED DESCRIPTION

Figure 1:
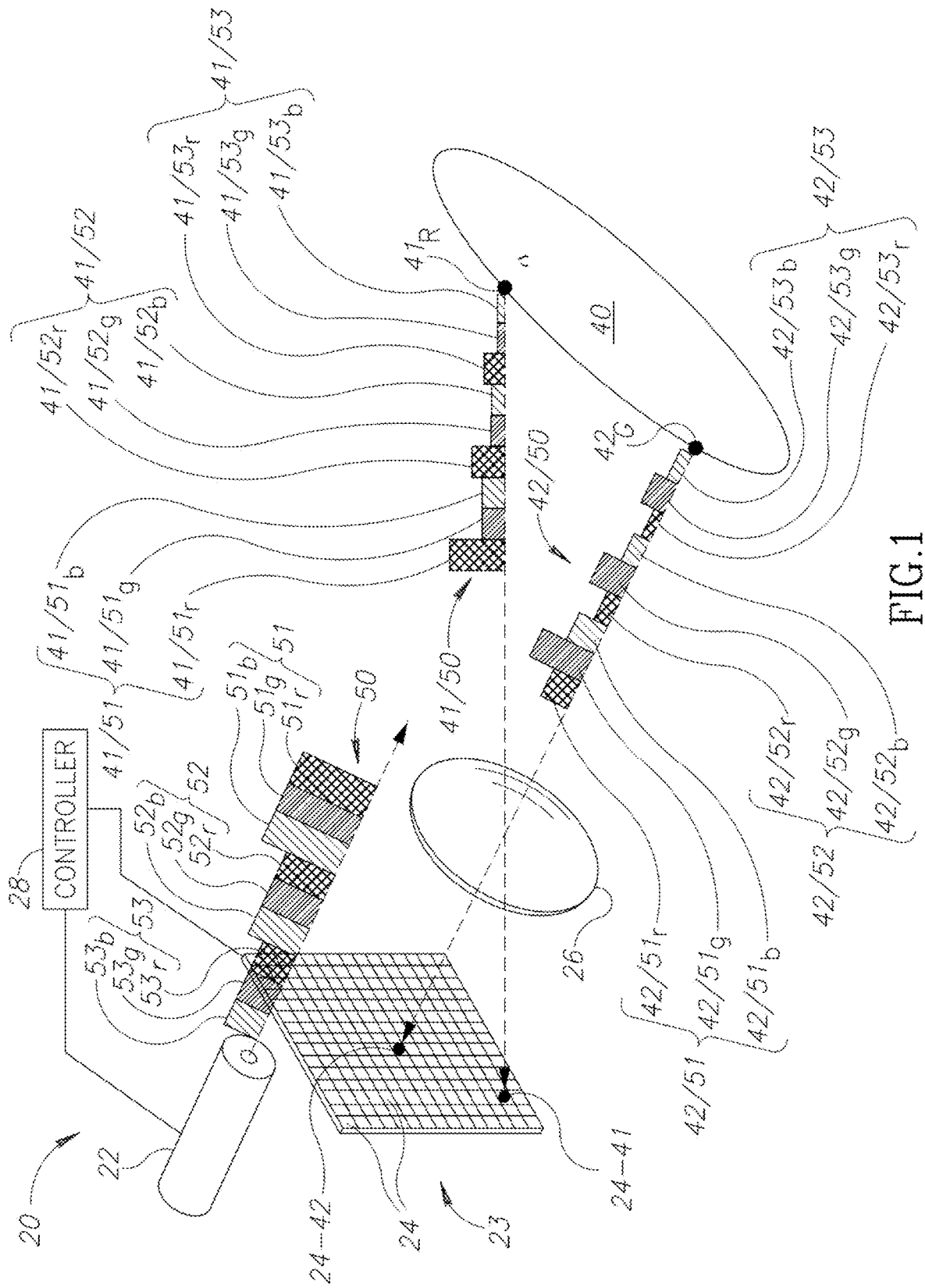
FIG. 1 schematically illustrates a DVS camera suitable for reproducing color images, according to an embodiment of the present invention.

An aspect of an embodiment of the disclosure relates to providing a DVS camera, also referred to as a DVS Color Camera (DVS-CCam), operable to provide color images of a scene that the camera images.

In accordance with an embodiment, the DVS-CCam optionally comprises a DVS photosensor, an illuminator operable to transmit a temporal light pattern in which intensity and/or color of the light pattern changes in time, a processor, and a controller that controls the illuminator and the processor. The temporal light pattern may be a light pattern characterized by substantially continuously changing intensity and/or color or a sequence of temporally contiguous or temporally separated light pulses of different intensities and/or different colors. Optionally, the DVS-CCam may include any type of Event-based camera sensor, including a neuromorphic cameras sensor, a silicon retina camera sensor, among other sensors suitable to perform the functions described herein, and may not be necessary limited a dynamic vision sensor.

When imaging a scene, the controller may by way of example control the illuminator, hereinafter, also referred to as a "flicker illuminator", or "flicker", to transmit a temporal light pattern comprising a sequence of light pulses at different intensities and different colors to illuminate the scene. At a rising edge and a falling edge of each transmitted light pulse or at a transition between a temporally, substantially contiguous transmitted light pulses of different color and/or amplitude, each pixel in the DVS photosensor senses a change in intensity and/or color of incident light as a change in intensity. Responsive to the sensed intensity change, each pixel generates a stream of DVS image signals, each DVS image signal comprising the pixel's address, for processing by the processor. A rate at which a given pixel generates DVS image signals and a total number of DVS image signals that the given pixel generates responsive to a sensed change are functions of color, amplitude, and/or shape of a transmitted light pulse or a transition between sequential light pulses that generated the sensed change, an impulse response function of the pixel, and a color of a feature in the scene that the given pixel images.

In an embodiment, the processor processes a stream of DVS image signals that a pixel generates in response to a change generated by a transmitted light pulse or a transition between sequential light pulses to determine a value, hereinafter a "DVS pixel response", which is a function of the color of the feature imaged by the pixel. Optionally, by way of example, the DVS pixel response that the processor determines is a sum of a number of DVS signals in at least a portion of the DVS image signal stream that the pixel generates responsive to the change. The processor processes the DVS pixel responses of the pixel to a plurality of changes in sensed intensity generated by the plurality of light pulses that flicker transmits to illuminate the scene to determine a color for the feature that best fits the pixel's DVS pixel responses. Optionally, a best fit color is a color that minimizes a linear mean square estimator for the DVS pixel responses and a function that predicts the DVS pixel responses based on the feature color.

In an embodiment a best fit color is determined by a neural network that provides a color for the feature responsive to a feature vector based on the DVS responses of the given pixel. Any of various color representations, such as by way of example the CIE color space, HSL (Hue, Saturation, Lightness), HSV (Hue, Saturation, Value), or RGB (Red, Blue, Green) may be used to characterize the color of the feature. In an embodiment the processor uses the best fit color determined for each of a plurality of pixels in the DVS photosensor to construct a color image of the scene.

In an embodiment, a constructed color image of the scene (may also be referred to hereinafter as "reconstructed" color image) may be used to reconstruct following frames in a video. Some, or optionally all, of the information associated with the colors in an image at a given time $t_0$ may be used to reconstruct a new image at a later time $t_1$.

FIG. 1 schematically illustrates an embodiment of a DVS-CCam 20. DVS-CCam 20 optionally comprises a flicker illuminator 22 operable to illuminate a scene with a light pattern that exhibits changes in intensity and color, a DVS photosensor 23 comprising light sensitive pixels 24 and an optical system represented by a lens 26 that focuses light reflected by features in the scene from the light pattern transmitted by flicker 22 onto the DVS photosensor. Light sensitive pixels 24 are configured to generate DVS image signals responsive to sensed changes in intensity of light incident on the pixels. A controller 28 controls operation of components of DVS-CCam 20. The controller may comprise a processor and memory for processing DVS image signals that pixels 24 generate responsive to changes in intensity of incident light sensed by the pixels, in accordance with an embodiment of the disclosure.

In FIG. 1, DVS-CCam 20 is schematically shown imaging a scene represented by an ellipse 40, and controller 28 is shown controlling flicker 22 to transmit optionally a sequence of substantially temporally contiguous light pulses 50 to illuminate the scene, in accordance with an embodiment of the disclosure. Transmitted light pulses 50 comprise light pulses characterized by different intensities and different, optionally relatively narrow frequency bands, of red (R), green (G), and blue (B) light. Optionally, light pulses 50 are transmitted in three groups 51, 52, and 53 of light pulses. Each light pulse group optionally comprises R, G, and B transmitted light pulses 50 respectively that are individually distinguished by distinctive hatching and labeled by the group number and a subscript r, g, or b identifying the color R, G, or B, of light in the light pulse. For example, R, G, and B transmitted light pulses in group 51 are referenced by $51_r$, $51_g$, and $51_b$ respectively. Light pulses in a same group, optionally as indicated by height of the light pulses in the group as shown in FIG. 1, have substantially a same intensity, and light pulses in different groups have different intensities.

Features in scene 40 reflect light from transmitted light pulses 50 in reflected light pulses from which light is imaged by optical system 26 on DVS pixels 24 in photosensor 23 that respectively image the features. Intensity of light in a reflected light pulse reflected by a feature in scene 40 from a transmitted light pulse 50 is a function of intensity of light in the transmitted light pulse, color of light in the transmitted light pulse, and color of the feature. Assuming that the frequency bands of transmitted light pulses 50 are sufficiently narrow, the color of light reflected from a given transmitted light pulse 50 by a given feature in scene 40 is substantially the same as that of the given transmitted light pulse.

For example, features in scene 40 indicated by circles $41_R$ and $42_G$ are assumed to be substantially red and substantially green colored features respectively. The features are schematically shown reflecting light from transmitted light pulses 50 in a sequence of reflected light pulses corresponding to the sequence of the transmitted light pulses.

Reflected light pulses reflected by feature $41_R$ from transmitted light pulses 50 in transmitted light pulse groups 51, 52, and 53 are respectively labeled by reflected light pulse group numbers 41/51, 41/52, and 41/53, subscripted by r, g, or b, to indicate respective colors of the reflected light pulses and that of the transmitted light pulses from which the reflected light pulses are reflected. For example reflected light pulses that feature $41_R$ reflects from transmitted light pulses $51_r$, $51_g$, and $51_b$ in transmitted light pulse group 51 are labeled as reflected light pulses $41/51_r$, $41/51_g$, and $41/51_b$ respectively. Reflected light pulses that feature $41_R$ reflects from transmitted light pulses $52_r$, $52_g$, and $52_b$ in transmitted light pulse group 52 are labeled as reflected light pulses $41/52_r$, $41/52_g$, and $41/52_b$ respectively. Reflected light pulses from feature $41_R$ may be referred to generically as reflected light pulses 41/50. Reflected light pulses from feature $41_R$ in a same light pulse group may generically be referred to by the label 41/51, 41/52, or 41/53 that references the reflected light pulse group to which the light pulse belongs. In FIG. 1 intensity of light in each reflected light pulse reflected by feature $41_R$ is schematically represented by height of the light pulse.

Because feature $41_R$ is assumed to be substantially red, the feature exhibits a relatively high reflectivity for R light relative to reflectivities for G and B light. As a result, whereas transmitted R, G, and B light pulses $51_r$, $51_g$, and $51_b$ in transmitted light pulse group 51 have a same intensity, reflected light pulse $41/51_r$ in corresponding reflected light pulse group 41/51 has a substantially greater intensity than either G or B reflected light pulses $41/51_g$ and $41/51_b$. Intensity of reflected light pulse $41/51_g$ is schematically shown greater than that of $41/51_b$ because it is assumed, by way of example, that feature $41_R$ has a greater reflectivity for G light than for B light. Intensities of reflected light pulses in reflected light pulse group 41/52 are less than intensities of corresponding reflected light pulses in reflected light pulse group 41/51 because intensity of light pulses in transmitted light pulse group 52 is less than intensity of transmitted light pulses in transmitted light pulse group 51. Intensities of reflected light pulses in group 41/53 are less than intensities of corresponding reflected light pulses in group 41/52.

Similarly, reflected light pulses reflected by green colored feature $42_G$ from transmitted light pulses in transmitted light pulse groups 51, 52, and 53 may be referred to generically as reflected light pulses 42/50 and individually by a group number to which they belong appropriately subscripted by r, g, or b. The reflected light pulses in a given group may generically be referred to by the group number to which they belong. In comparison with reflected light pulses 41/50 from red feature $41_R$ for which reflected R light pulses $41/51_r$, $41/52_r$, and $41/52_r$ exhibit enhanced intensities, for reflected light pulses 42/50 from green feature $42_G$ reflected G light pulses $41/51_g$, $41/52_g$, and $41/52_g$ exhibit enhanced intensities.

Light from reflected light pulses 41/50 reflected by feature $41_R$ is collected and imaged on a DVS pixel 24-41 by optical system 26. Responsive to the incident light, DVS pixel 24-41 generates a stream of DVS image signals for a change in intensity and/or color of light sensed by the pixel that is generated by each transition between temporally adjacent reflected light pulses 41/50. Features of the stream of DVS image signals generated for a given transition between reflected light pulses 41/50 are functions of the intensity and color of the given reflected light pulses at the transition, and thereby of the color of feature $41_R$.

Similarly, light from reflected light pulses 42/50 reflected by feature $42_G$ is collected and imaged on a DVS pixel 24-42 by optical system 26. DVS pixel 24-42 generates a stream DVS image signals for a change in intensity of light sensed by the pixel that is generated by each transition between temporally adjacent reflected light pulses 42/50. Features of the stream of DVS image signals generated for a given transition between reflected light pulses 42/50 are functions of the intensities and/or colors of the reflected light pulses 42/50 at the given transition and thereby of the color of feature $42_G$. Since reflected light pulses 41/50 from feature $41_R$ and reflected light pulses 42/50 from feature $42_G$ exhibit different intensity patterns a sequence of DVS image signal streams generated by DVS pixel 24-41 responsive to transitions between reflected light pulses 41/50 from feature $41_R$ is different from a sequence of DVS image signal streams that DVS pixel 24-42 generates responsive to transitions between reflected light pulses 42/50 from feature $41_G$. The sequences of DVS image signal streams generated by DVS pixels 24-41 and 24-42 distinguish the color of feature $41_R$ from the color of feature $42_G$.

In accordance with an embodiment of the disclosure DVS-CCam 20 processes the streams of DVS image signals from DVS pixels 24-41 and 24-42 that image features 41$_R$ and 41$_G$ and steams of DVS image signals generated DVS pixels 24 imaging other features in scene 40 to determine respective colors of the features and from the determined colors a color image of scene 40.

In an embodiment, DVS-CCam 20 determines a DVS pixel response for each stream of DVS image signals that a given DVS pixel 24 in photosensor 23 generates responsive to a change in sensed light intensity produced by a transition between reflected light pulses 50. Optionally, the DVS pixel response is equal to a sum of a number of DVS image signals that the given pixel generates responsive to the transition between first and second bounding times. For an abrupt change in color and/or intensity of light at a transition, a signal rate at which a DVS pixel 24 generates DVS image signals may be modeled by very fast rise time to a maximum signal rate followed by an exponential decay fall time to a background signal rate. Optionally, by way of example, the first bounding time may be a time at which the signal rate reaches the maximum and the second bounding time may be a time at which the signal rate has decayed to a rate considered to be equal to the background signal rate. Assume that there are N light pulses transmitted to illuminate scene 40 and N transitions for which the pixel generates DVS image signal streams. Let a DVS pixel response generated for an n-th transition between n-th pulse and a preceding (n−1) pulse transmitted by flicker 22 by a given DVS pixel 24 be represented by DVS-PR(x,y)$_{(n-1),n}$, 2≤n≤N, where x and y are row and column coordinates of the given pixel in photosensor 23. Then DVS-PR(x,y)$_{(n-1),n}$ may be expected to be equal to a value provided by a pixel response function $\mathcal{PRF}$. The pixel response function $\mathcal{PRF}$ is expected to be a function of a color of the feature in scene 40 imaged on DVS pixel 24 and the colors and intensities of the transmitted pulses 50 at the transition that illuminated the feature imaged on the pixel and from which the feature reflected light to the pixel. In symbols:

$$DVS\text{-}PR(x, y)_{(n-1)n} = \tag{1}$$
$$\mathcal{PRF}(F(x, y, r_f, g_f, b_f), TP50_{(n-1)}(r, g, b, I), TP50_n(r, g, b, I)),$$

In expression (1), F(x,y,r$_f$,g$_f$,b$_f$) is the feature imaged on DVS pixel 24 located at row and column coordinates x, y, and having an unknown color expressed in RGB color components represented by r$_f$, g$_f$, and b$_f$ respectively. TP50$_n$ (r$_n$,g$_n$,b$_n$,I$_n$) represents the n-th transmitted light pulse 50 having known color coordinates r$_n$, g$_n$, b$_n$, and intensity I$_n$.

In an embodiment unknown feature colors r$_f$, g$_f$, and b$_f$ may be determined by determining values for the color components r$_f$, g$_f$, and b$_f$ that minimize a cost function of a difference between the actual values for DVS-PR(x,y)$_n$ and predicted values $\mathcal{PRF}$ (F(x,y,r$_f$,g$_f$,b$_f$), TP50$_n$ (r,g,b,I)). Optionally the feature colors $\hat{r}_f$, $\hat{g}_f$, $\hat{b}_f$ are determined by a minimizing a least squares cost function with respect to (r$_f$, g$_f$, b$_f$):

$$\hat{r}_f, \hat{g}_f, \hat{b}_f = \arg \min \tag{2}$$
$$\sum\nolimits_1^N \left[ \begin{pmatrix} DVS\text{-}PR(x, y)_n \end{pmatrix} - \mathcal{PRF} \begin{pmatrix} F(x, y, r_f, g_f, b_f), \\ TP50_{(n\_1)}(r, g, b, I)), TP50_n(r, g, b, I) \end{pmatrix} \right]^2$$

Figure 2:
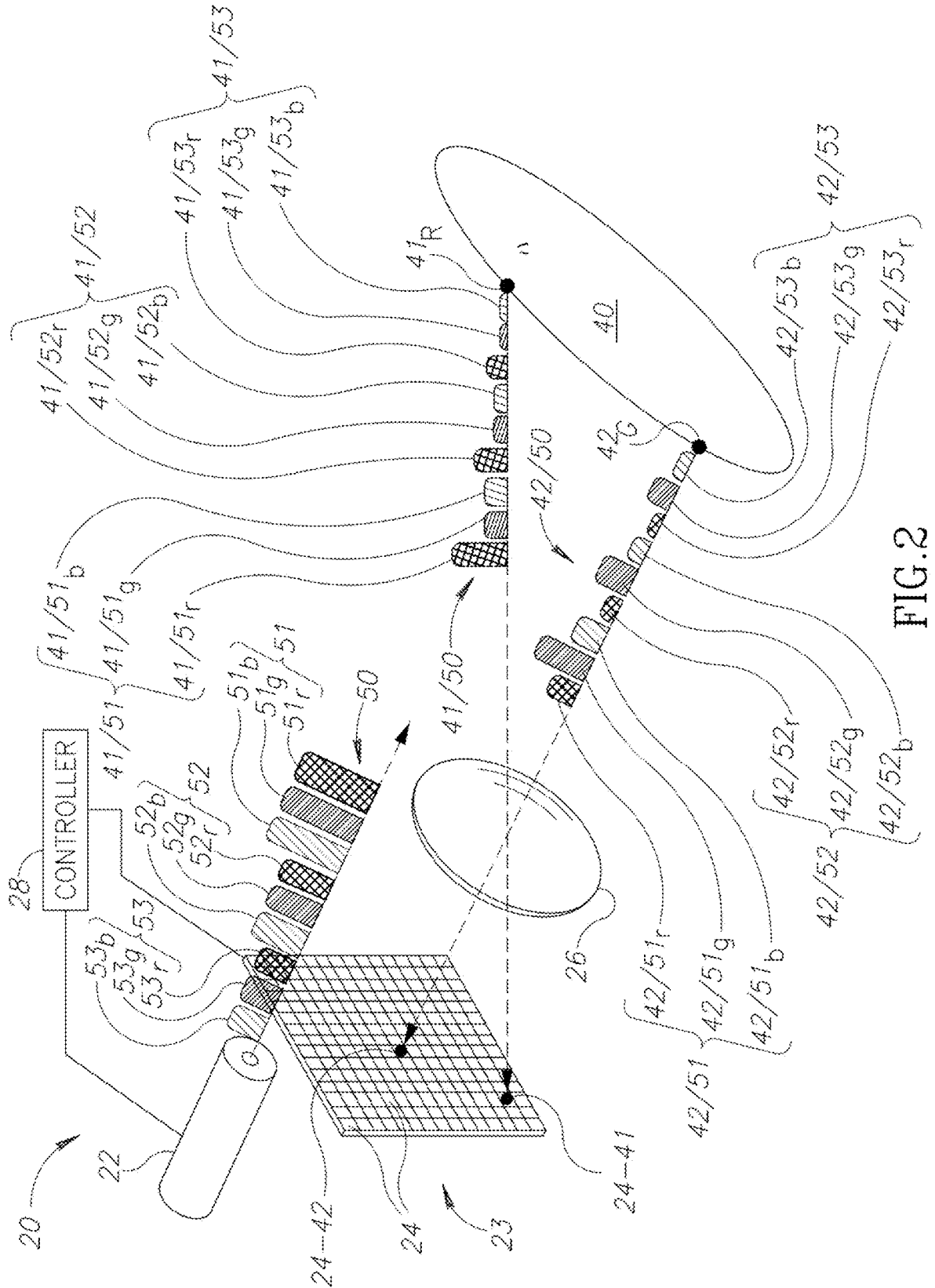
FIG. 2 schematically illustrates a DVS camera for reproducing color images and configured to transmit discrete temporally separated light pulses, according to an embodiment of the present invention.

It is noted that whereas FIG. 1 assumes that transmitted light pulses 50 are temporally contiguous, practice of embodiments of the disclosure are not limited to contiguous light pulses. A DVS-CCam in accordance with an embodiment may illuminate a scene with a continuously changing light pattern or temporally separated light pulses. By way of example, FIG. 2 schematically illustrates an embodiment of the DVS-CCam 20 transmitting discrete temporally separated light pulses to illuminate scene 40. DVS image signals generated by a pixel responsive to both rise and fall times of the transmitted pulses may be used to determine a color of a feature in the scene imaged on the pixel.

It is further noted that whereas FIGS. 1 and 2 schematically show DVS-CCam 20 illuminating scene 40 with RGB visible light, a DVS-CCam in accordance with an embodiment may illuminate a scene with light at a plurality of wavelength bands other than RGB or visible wavelength bandwidths and generate "color" images of the scene in the other wavelength bands.

Figure 3:
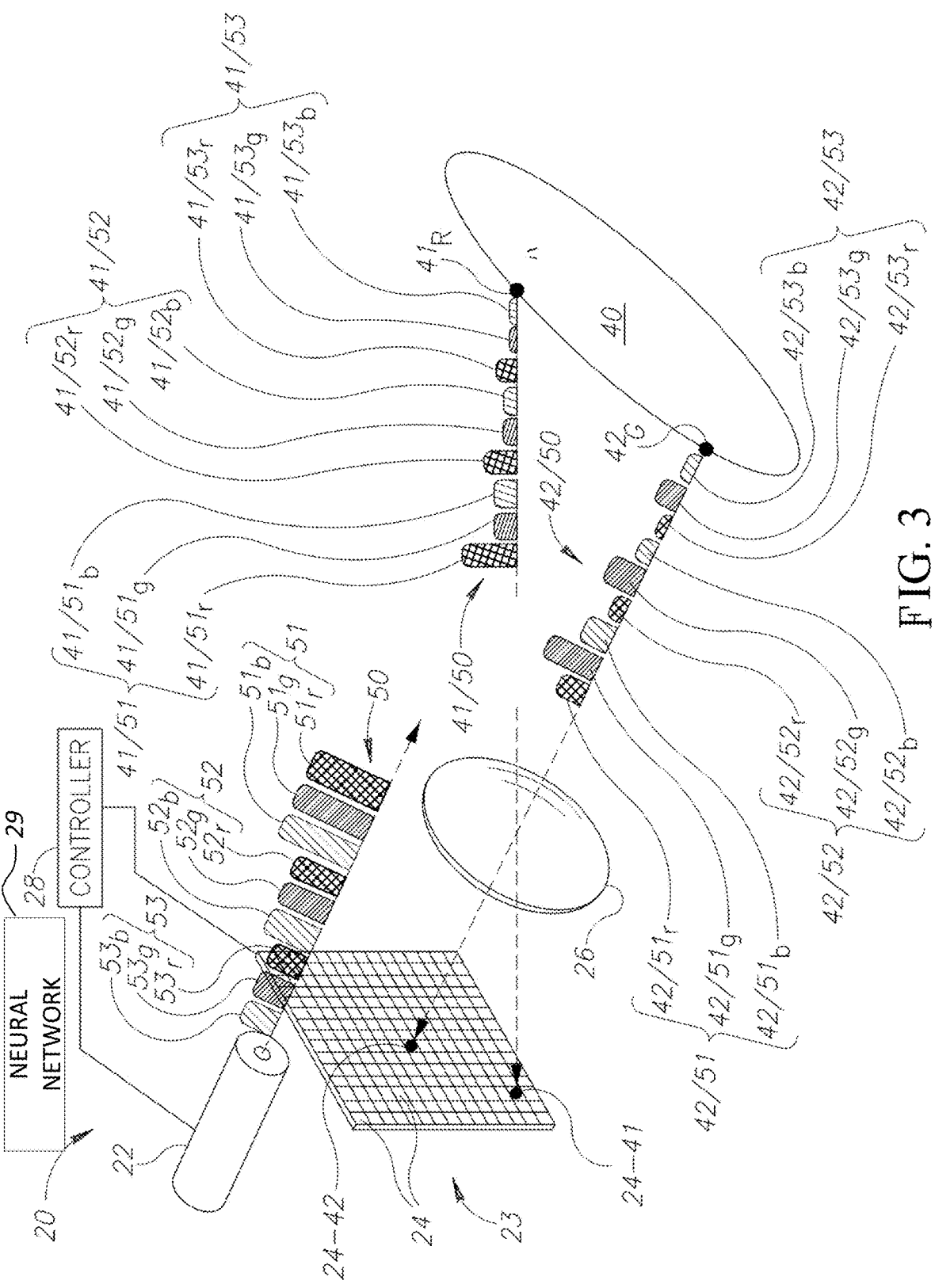
FIG. 3 schematically illustrates a DVS camera for reproducing color images and including a neural network, according to an embodiment of the present invention.

FIG. 3 schematically illustrates an embodiment of DVS-CCam 20 shown in FIGS. 1 and 2 and including a neural network (NN) 29. NN 29 may optionally be a convolutional neural network (CNN) which may include a non-linear estimator for the color, and may additionally take into account an inherent spatial correlation in the output of DVS-CCam 20 to reduce noise. NN 29 may determine the feature color by receiving a feature vector for each DVS pixel 24 having components DVS-PR(x,y)$_n$,1≤n≤N.

NN 29 may include a contracting path and an expanding path, and may include a plurality of layers connecting the paths to optionally add weights to improve the NN model. An exemplary architecture of NN 29 may be a CNN based on U-Net and Xception. Each layer in the contracting path may reduce the spatial dimensions and may increase the number of channels, optionally using repeated Xception layers based on separable convolutions. Each layer in the expanding path may increase the spatial dimensions and may reduce the channels using separable transposed convolutions. The end of the expanding path may provide the desired output size, which may be optionally the same as the input size, and the channels may be reduced down to 3 channels, 1 for each RGB color. Optionally, the path connecting the contracting and expanding layers may preserve the size of the data.

A loss function may be used which may optionally be a weighted average of the L$_1$ norm and a structural similarity index measure (SSIM) index and may be given by the following equation, where MS-SSIM is a multiscale SSIM:

$$\mathcal{L}(Y, \hat{Y}) = 0.8\|\hat{Y} - Y\| + 0.2L_{MS-SSIM}(\hat{Y}, Y) \tag{3}$$

where $\hat{Y}$ and Y represent the reconstructed and real image.

It is that noted that despite NN 29 being described with reference to the expanding path reducing the channel to 3 channels for RGB color, the neural network in accordance with an embodiment may allow for the extraction of more spectral components from different colored light sources other than RGB light thereby allowing DVS-CCam to generate "color" images of the scene in other wavelength bands. Optionally, from non-visible light sources, for example infrared light sources. This aspect may be particularly advantageous as hyperspectral images may be generated for possible use in applications involving use of image segmentation, classification, and recognition, among other suitable applications. It is further noted that the loss function, although described with reference to including $L_1$ and a SSIM index (MM-SSIM), other loss functions may be used.

Applicant conducted a number of tests to evaluate the efficacy of the DVS camera of the present invention. In a first round of testing, the DVS camera used linear estimation to reconstruct the color images, and in a second round, the DVS included a CNN to perform non-linear estimation and reconstruct the color images. A DVS system employed for conducting the tests is described below in the section Test Setup.

A. Test Setup

The test setup included use of a commercial DVS (Samsung DVS Gen3, 640×480 resolution) positioned facing a static scene a distance of 14 inches (35.5 cm) away. For the flicker, a screen capable of producing light of different wavelengths and intensities was used. The flicker, which covered a larger surface area than the region of the scene captured by the DVS in order to provide relatively uniform illumination, was placed directly behind the camera facing the scene. The flicker changed the emitted color at a frequency of 3 Hz. For the calibration process (to train the CNN) an RGB camera (Point Grey Grasshopper3 U3, 2.3 MP) adjacent to the DVS was used. The scene was static in order to prevent the camera from detecting images if the flicker did not change color or intensity. The test setup was designed to allow capturing a bitstream generated by the DVS as a response to the flicker, from which a single RGB frame was produced. This frame is an RGB image of the scene and is the same resolution as the original DVS video.

For evaluating the DVS including the CNN, the CNN was first trained. A labeled data set was created using a stereoscopic system of the combined DVS and the RGB camera. The camera's resolution is 1920×1200 with a frame rate of 163 fps and an 8 bit color depth for each of the three color channels. The calibration process yielded matching sets of points in each of the sensors using the Harris Corner Detector algorithm, which was then used to calculate a holography that transforms the perspective of the RGB sensor to the perspective of the DVS sensor. The calibration process assumed the captured scene was located in a dark room on a plane at a distance of 14" from the DVS sensor. Therefore, training data were taken on 2D scenes for preserving the calibration accuracy. Each training sample contained a series of frames, most of which hold the responses of the scene to the changes in the flicker, and a minority of the frames were background noise frames before the changes in the flicker. For example, in the case of an RGB flicker with three intensities, 32 frames per color and intensity, totaling 288 frames, were used.

B. Test Results

Figure 4:
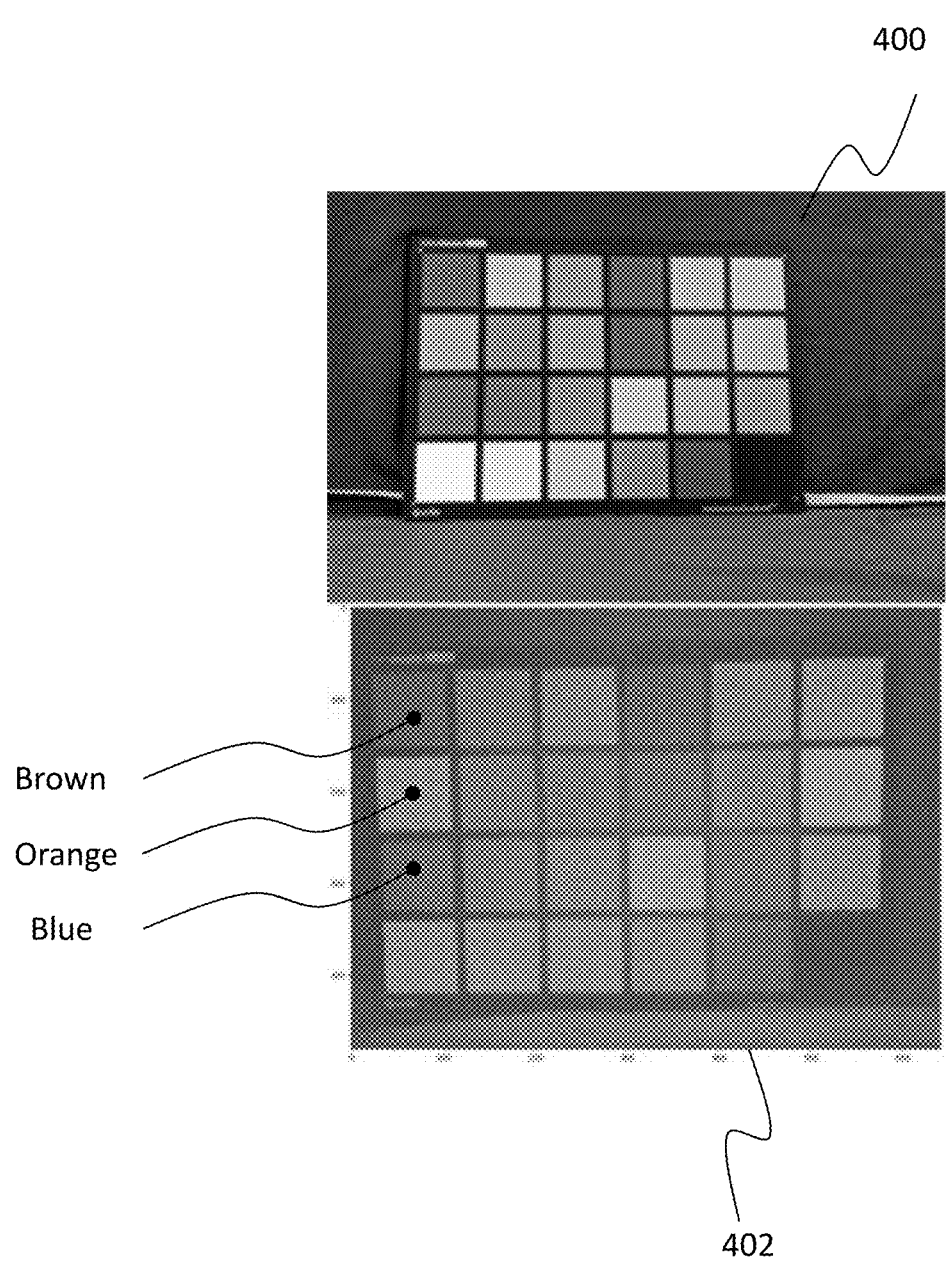
FIG. 4 shows results of linear reconstructions of colored images using a DVS camera system in a test setup, according to an embodiment of the present invention. The colored images are converted into black and white images where different shades of grey represent different colors. This conversion also applies to the following figures.

FIG. 4 shows results of linear reconstructions of colored images. Image 400 is the static scene which is a color matrix from X-Rite. Image 402 is the color reconstruction. For evaluating the DVS using linear estimation, the color of each pixel was reconstructed from a sum of DVS events for each specific pixel in order to recreate the full RGB image. Although color reconstruction was successful, the quality of the reconstruction is noisy. This is due to the ignoring of the spatial correlation between the colors of neighboring pixels.

Figure 5:
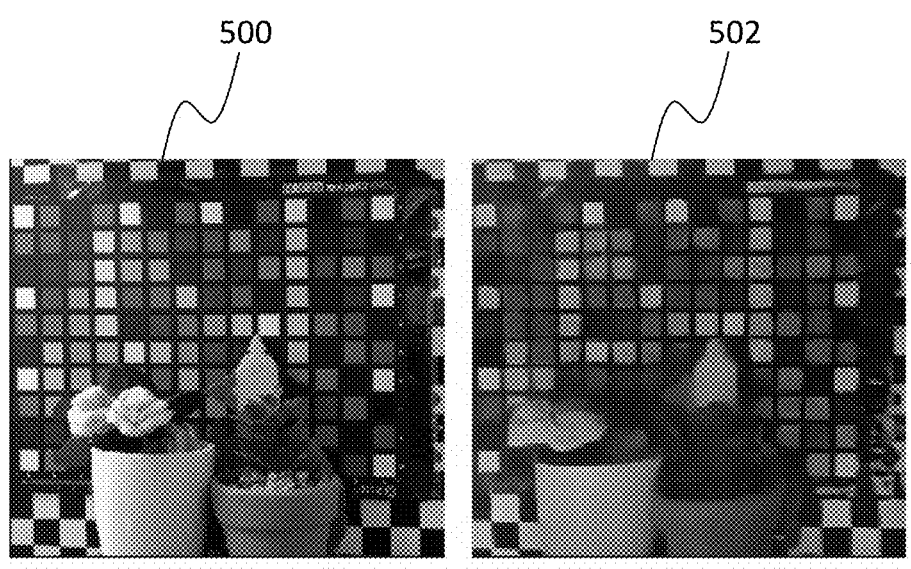
FIG. 5 shows several results of using a DVS system including a convolutional neural network (CNN) in a test setup for color reconstruction of three-dimensional (3D) scenes, according to an embodiment of the present invention.
Figure 5:
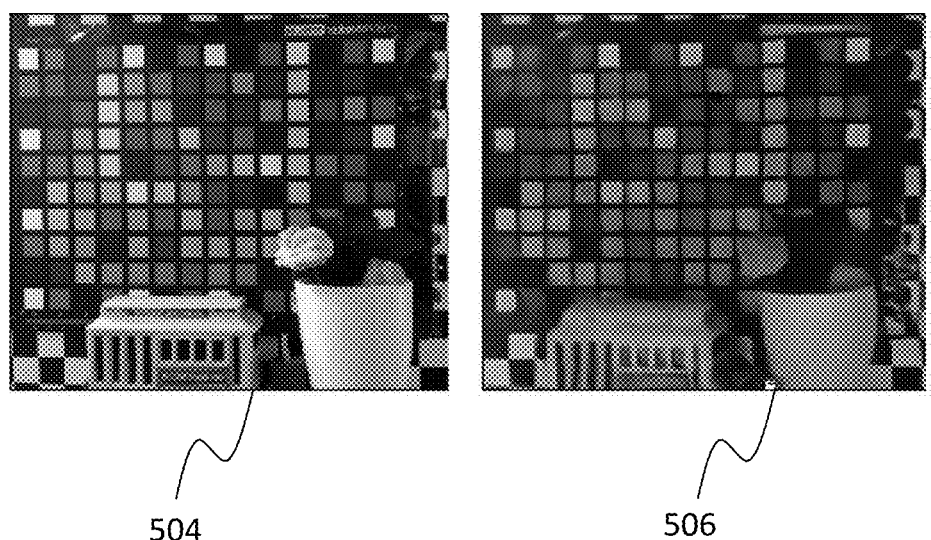

FIG. 5 shows several results of using the CNN for the color reconstruction of three-dimensional (3D) scenes at a distance of 14 inches away from the DVS sensor (distance is measured from the DVS lens to the center of the 3D scene). Images 500 and 504 are the original images, and images 502 and 506 are the reconstructed images, respectively. The root mean square error (RMSE) for image 502 is 45, and for image 506 is 47. The resulting reconstruction shows high fidelity and low noise. Thus, this solution may be viable for colors reconstruction of 3D and 2D scenes.

Figure 6:
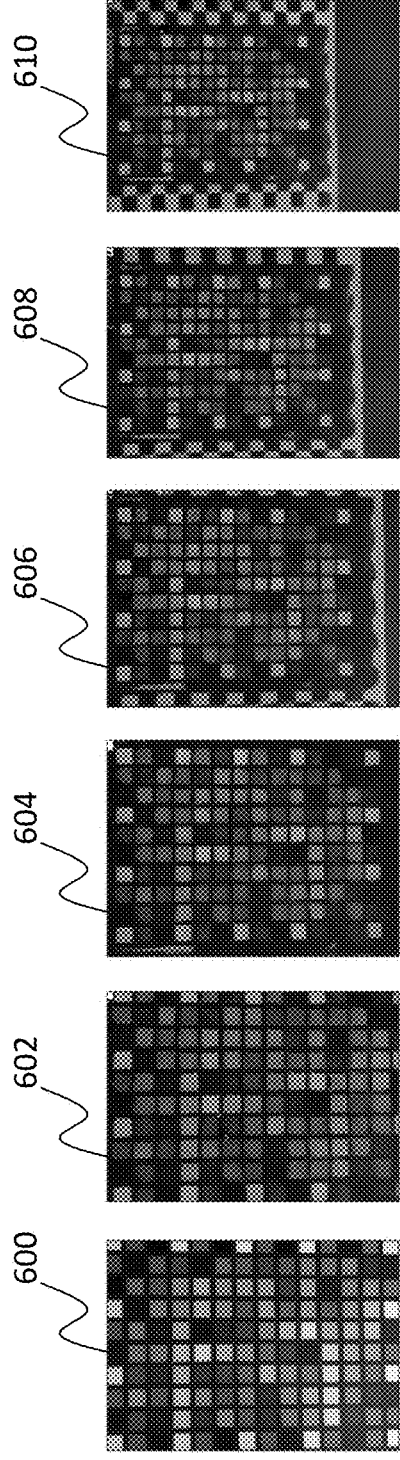
FIG. 6 shows results of the robustness of the DVS camera system of FIG. 5 to changes in distance and its effect on color reconstruction when exposed to the same ambient brightness as used in the training of the CNN, according to an embodiment of the present invention.

FIG. 6 shows results of the robustness of the system to changes in distance and its effect on color reconstruction when exposed to the same ambient brightness as used in the training of the CNN. The scene (color matrix) was initially placed at a distance of 14 inches (35.5 cm) from the DVS camera, and color images were reconstructed at increased distances of 2 inch intervals. Image 600 is the color reconstruction for an increased distance from the initial 14 inches (35.5 cm) between the scene and the DVS camera of 5.08 cm, image 602 for an increased distance of 11.176 cm, image 604 for an increased distance of 17.272 cm, image 606 for an increased distance of 23.368 cm, image 608 for an increased distance of 29.454 cm, and image 610 for an increased distance of 35.56 cm. It may be appreciated from the images that color reconstruction using the CNN is not limited to fixed training distances but may allow for a distance generalization.

Some stages (steps) of the aforementioned method(s) may also be implemented in a computer program for running on a computer system, at least including code portions for performing steps of the relevant method when run on a programmable apparatus, such as a computer system or enabling a programmable apparatus to perform functions of a device or system according to the disclosure. Such methods may also be implemented in a computer program for running on the computer system, at least including code portions that make a computer execute the steps of a method according to the disclosure.

A computer program is a list of instructions such as a particular application program and/or an operating system. The computer program may for instance include one or more of: a subroutine, a function, a procedure, a method, an implementation, an executable application, an applet, a servlet, a source code, code, a shared library/dynamic load library and/or other sequence of instructions designed for execution on a computer system.

The computer program may be stored internally on a non-transitory computer readable medium. All or some of the computer program may be provided on computer readable media permanently, removably or remotely coupled to an information processing system. The computer readable media may include, for example and without limitation, any number of the following: magnetic storage media including disk and tape storage media; optical storage media such as compact disk media (e.g., CD-ROM, CD-R, etc.) and digital video disk storage media; nonvolatile memory storage media including semiconductor-based memory units such as FLASH memory, EEPROM, EPROM, ROM; ferromagnetic digital memories; MRAM; volatile storage media including registers, buffers or caches, main memory, RAM, etc.

A computer process typically includes an executing (running) program or portion of a program, current program values and state information, and the resources used by the operating system to manage the execution of the process. An operating system (OS) is the software that manages the sharing of the resources of a computer and provides programmers with an interface used to access those resources. An operating system processes system data and user input, and responds by allocating and managing tasks and internal system resources as a service to users and programs of the system.

The computer system may for instance include at least one processing unit, associated memory and a number of input/output (I/O) devices. When executing the computer program, the computer system processes information according to the computer program and produces resultant output information via I/O devices.

Unless otherwise stated, the use of the expression "and/ or" between the last two members of a list of options for selection indicates that a selection of one or more of the listed options is appropriate and may be made.

It should be understood that where the claims or specification refer to "a" or "an" element, such reference is not to be construed as there being only one of that element.

All references mentioned in this specification are herein incorporated in their entirety by reference into the specification, to the same extent as if each individual reference was specifically and individually indicated to be incorporated herein by reference. In addition, citation or identification of any reference in this application shall not be construed as an admission that such reference is available as prior art to the present disclosure.

While this disclosure has been described in terms of certain embodiments and generally associated methods, alterations and permutations of the embodiments and methods will be apparent to those skilled in the art. The disclosure is to be understood as not limited by the specific embodiments described herein, but only by the scope of the appended claims.

What is claimed is:

1. A dynamic vision sensor (DVS) color camera (DVS-CCam) operable to acquire a color image of a scene, the DVS-CCam comprising:

a DVS photosensor comprising DVS pixels;

an illuminator operable to transmit a light pattern characterized by temporal changes in intensity and color to illuminate a scene;

an optical system configured to collect and focus on the DVS pixels light reflected by features in the scene from the light pattern transmitted by the illuminator;

a processor configured to process DVS signals generated by the DVS pixels responsive to temporal changes in the reflected light to provide a color image of the scene; and a neural network (NN) configured to provide a color to a feature vector based on a pixel response value associated with a DVS pixel.

2. The DVS-CCam of claim 1, wherein the transmitted light pattern comprises temporally contiguous light pulses.

3. The DVS-CCam of claim 1, wherein the transmitted light pattern comprises discrete temporally separated light pulses.

4. The DVS-CCam of claim 1, wherein the transmitted light pattern comprises red, green, and blue light.

5. The DVS-CCam of claim 1, wherein each pixel of the DVS pixels generates a stream of DVS image signals responsive to a change in light intensity during the temporal changes in the reflected light.

6. The DVS-CCam of claim 1 wherein information associated with the color image is used for reconstructing a next image.

7. The DVS-CCam of claim 1, wherein the DVS photosensor comprises an event-based photosensor.

8. The DVS-CCam of claim 1, wherein the NN is configured to extract spectral components from visible light other than RGB light for generating hyperspectral images.

9. The DVS-CCam of claim 1, wherein the NN comprises a contracting part, an expanding part, and a plurality of layers connecting the contracting part and the expanding part.

10. The DVS-CCam of claim 9, wherein the contracting part reduces spatial dimensions and increases a number of channels.

11. The DVS-CCam of claim 9, wherein the expanding part increases spatial dimensions and reduces a number of channels to a reduced number of channels.

* * * * *